United States Patent [19]

Kishida et al.

[11] Patent Number: 4,510,984

[45] Date of Patent: * Apr. 16, 1985

[54] PNEUMATIC RADIAL TIRE HAVING DURABLE BEAD STRUCTURE

[75] Inventors: Katsuji Kishida, Takatsuki; Tetsuto Ueno, Hyogo; Masakazu Onishi; Keijiro Oda, both of Kawanishi, all of Japan

[73] Assignee: The Toyo Rubber Industry Co., Ltd., Osaka, Japan

[ * ] Notice: The portion of the term of this patent subsequent to Sep. 18, 2001 has been disclaimed.

[21] Appl. No.: 390,921

[22] Filed: Jun. 22, 1982

[30] Foreign Application Priority Data

Jun. 24, 1981 [JP] Japan .................................. 56-98839

[51] Int. Cl.$^3$ .............................................. B60C 15/06
[52] U.S. Cl. ........................... 152/362 CS; 152/354 R
[58] Field of Search ......... 152/362 R, 362 CS, 354 R, 152/354 RB, 355, 356 R, 356 A

[56] References Cited

U.S. PATENT DOCUMENTS

| | | | |
|---|---|---|---|
| 3,612,137 | 10/1971 | Guyot | 152/362 R |
| 3,612,138 | 10/1971 | Ravenhall | 152/362 R |
| 4,093,014 | 6/1978 | Tomoda et al. | 152/362 R |
| 4,215,737 | 8/1980 | Motomura et al. | 152/362 CS |
| 4,227,563 | 10/1980 | Grosch et al. | 152/362 R |
| 4,319,621 | 3/1982 | Motomura et al. | 152/362 CS |
| 4,387,759 | 6/1983 | Obata et al. | 152/362 CS |

FOREIGN PATENT DOCUMENTS

| | | | |
|---|---|---|---|
| 2127163 | 10/1972 | France | 152/362 R |
| 52-39204 | 3/1977 | Japan . | |
| 30504 | 3/1978 | Japan | 152/362 CS |
| 55-119501 | 10/1978 | Japan . | |
| 55-106806 | 8/1980 | Japan | 152/362 CS |
| 55-106805 | 8/1980 | Japan . | |
| 102707 | 8/1980 | Japan | 152/362 CS |
| 1244050 | 8/1971 | United Kingdom | 152/362 R |
| 2035228 | 6/1980 | United Kingdom | 152/362 CS |

Primary Examiner—Lois E. Boland
Attorney, Agent, or Firm—Koda and Androlia

[57] ABSTRACT

A pneumatic radial tire having highly durable bead structure is disclosed. One or more carcass ply layers of steel cords are turned up around a bead core from the inside to the outside. A reinforcing strip of steel cords is positioned outwardly adjacent to the turn-ups of carcass plies. A bead filler of approximately triangular sectional shape is disposed at the region enclosed by the carcass plies, the turn-ups of the carcass plies and the reinforcing strip of steel cords. The bead filler comprises high hardness rubber stock and medium hardness rubber stock. A cap of organic textile cord fabric covers an upper end of the reinforcing strip of steel cords. A fin-shaped rubber buffer having a hardness lower than that of the medium hardness rubber stock by 3° to 20° is disposed radially outwardly of the capped end and axially outwardly adjacent to the medium hardness rubber stock. A reinforcing strip of organic textile cords may be further disposed outwardly adjacent to the reinforcing strip of steel cords.

4 Claims, 3 Drawing Figures

PNEUMATIC RADIAL TIRE HAVING DURABLE BEAD STRUCTURE

BACKGROUND OF THE INVENTION

1. Field of the Invention

This invention relates to an improvement of bead structure of a pneumatic radial tire having carcass plies made of steel cords for heavy duty vehicles such as trucks, light trucks, buses and so forth and more particularly to a fundamental improvement of the contact part between a bead region, whose deformation is suppressed by a rim flange, and a lower side region, which undergoes easy load deformation, to eliminate the occurence of separation failure.

2. Prior Art

In a conventional pneumatic radial tire for heavy duty vehicles, carcass plies of a tire are turned up around a bead core and terminate at a lower region of a side wall and turn-ups of the carcass plies are generally covered by a reinforcing strip of rubberized steel cords extending to a side wall. In such a structure, a great difference or dislocation in rigidity occurs between both at the ends of the turn-up of the carcass plies or at the upper end of the reinforcing strip of rubberized steel cords and a surrounding rubber. The dislocation in rigidity generates a shearing stress due to a tire deformation caused by repeated load stress resulting from the rotation of tires. Consequently, separation occurs between the steel cords and a surrounding rubber due to the shearing stress.

Some proposals have been made to overcome the problems. In the Japanese Patent Applications laid open under No. 53-119501 and No. 55-106806, high hardness rubber is disposed adjacent to both ends of carcass ply turn-ups and of a reinforcing strip of metallic cords as to cover both ends so that the dislocation in rigidity occurs between the metallic cords and the surrounding rubber can be decreased so as to decrease the concentration of strain at the upper ends of the metallic cords and to prevent a separation.

According to the Japanese Utility Model Publication No. 52-48482, the upper end of a reinforcing layer of steel cords is covered with textile cord fabric so as to prevent the free upper end of the steel cords from moving and thereby to prevent them from being in contact with a surrounding rubber and thereby intended to suppress the inducement of separation and to eliminate a separation problem.

The above described proposals for preventing a separation are directed to obtain a separation resistance structure by reinforcing the places liable to cause a separation. But they have not settled the problem substantially because the concentration points of stress are merely transferred to some other points so that a separation is induced in a different manner.

SUMMARY OF THE INVENTION

It is therefore an object of the present invention to provide a novel separation resistance structure wherein the shearing stress occurring in the structure can be dispersed and absorbed into a flexible member so as to eliminate a strain in a bead portion and to prevent the occurrence of separation at the upper ends of carcass turn-ups and a reinforcing element.

The general feature of the present invention is to dispose a low hardness rubber for a buffer at the contact part between a bead region, whose deformation is suppressed by a rim flange, and a lower side region, which undergoes easy load deformation and more particularly at the part positioned at the lower portion of side wall subjected to the concentration of stress and positioned radially outwardly elongated region of a reinforcing strip of steel cords. With this arrangement, the stress occurred concentrates into an easily deformable low hardness rubber so that the stress is dispersed and absorbed into a low hardness rubber deformed with the concentration of stress. The incorporation of such a flexible structure at the upper part of the bead region eliminates the strain in a bead portion and prevents the occurence of separation.

More particularly, a pneumatic radial tire according to the present invention comprises one or more carcass plies of steel cords extending from one bead portion to another bead portion across a crown portion and disposed at an angle of 90° relative to the equatorial line of the tire, the opposite ends of the carcass plies being turned up around a respective annular bead core from the inside to the outside and terminating at the bead region, a reinforcing strip of steel cords positioned outwardly adjacent to the turn-ups of carcass plies and extending beyond the turn-ups, a bead filler of approximately triangular sectional shape consisting of high hardness rubber stock of approximately triangular sectional shape and medium hardness rubber stock having a radial dimension longer than that of the high hardness rubber stock and positioned outwardly adjacent to the high hardness rubber stock, said bead filler being disposed at the region enclosed by the carcass plies, the turn-ups of the carcass plies and the reinforcing strip of steel cords with a top portion extending to the side wall, a cap of organic textile cord fabric covering an upper end of the reinforcing strip of steel cords and a fin-shaped rubber buffer having a hardness lower than that of the medium hardness rubber stock by 3° to 20° disposed radially outwardly of the capped end and outwardly adjacent to the medium hardness rubber stock. To further dispose a reinforcing strip of organic textile cords positioned outwardly adjacent to the reinforcing strip of steel cords is also within the range of the present invention.

The terms, employed herein, "outwardly" means "farther from the bore of a tire in the axial direction" and "radially outwardly" means "farther from the rotating axle of the tire in the radial direction".

As described above, the difference in hardness between the rubber buffer and the medium hardness rubber stock is set in the range of 3°–20° in Shore hardness, but more preferably in the range of 5°–15°. The desirable range of the hardness of the rubber buffer is from 45°–65° in Shore hardness and that of the medium hardness rubber stock is from 55°–70° in Shore hardness. If the difference in the hardness between the rubber buffer and the medium hardness rubber stock is less than 3°, the effect for improving the durability of the bead region is small.

To make the difference in the hardness between both rubbers more than 20°, the hardness of the medium hardness rubber stock should be high and the hardness of the rubber buffer should be low. As a matter of fact, the larger the difference in the hardness between the two rubbers is, the more easily the stress disperses in the rubber buffer. In order to make the hardness of the rubber buffer small, however, the composition ratio of carbon black which is a reinforcing agent of a rubber component should be decreased. As a result, a rubber composition becomes inferior in thermal resistance. Conversely, to make high the hardness of the medium hardness rubber stock results in a decrease in flexural fatigue resistance to deteriorate the durability of the bead portion.

The medium hardness rubber stock of bead filler is preferably divided into two rubbers. A comparatively high hardness rubber is used adjacent to the high hardness rubber stock of bead filler having triangular sectional shape, and a comparatively low hardness rubber is used adjacent to the rubber buffer while keeping the difference range of 3° to 20° higher than the hardness of the rubber buffer. Such arrangement increases the stress dispersion efficiency of the rubber buffer.

The present invention is directed to a pneumatic radial tire which is used with high inflation pressure of more than 3 kg/cm$^2$ and has one or more strip of carcass plies of steel cords. The radial dimension of the reinforcing strip of steel cords is settled 1.1 to 1.6 times as large as that of the turn-ups of the carcass plies.

DETAILED DESCRIPTION OF THE INVENTION

Figure 1:
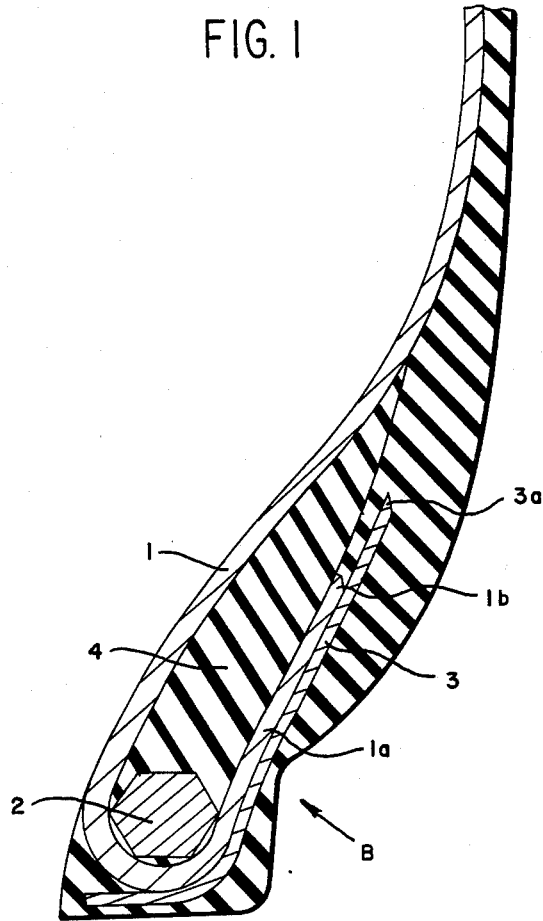
FIG. 1 is a cross-sectional view of the lower part of a conventional tire.

In FIG. 1, reference numeral 1 designates carcass plies disposed at an angle of 90° with respect to the equatorial line of the tire extending from one bead portion to another bead portion, and turned up around a bead core 2 from the inside to the outside. Reinforcing strip of rubberized steel cords 3 is provided outwardly adjacent to the turn-ups 1a of the said carcass plies 1 to increase the rigidity of the bead portion. A bead filler 4 of high hardness rubber is applied in the area enclosed by the carcass plies 1, their turn-ups 1a and the reinforcing strip of steel cords 3.

In such a conventional tire, the bead filler 4 of high hardness tends to move in accordance with the movement of the carcass plies, whereas the turn-ups 1a is restrained from moving by a rim flange, thereby causing a repeated shearing stress between the bead filler 4 and both upper ends 1b, 3a of the carcass turn-ups and of the reinforcing strip of the steel cords. As a result, both upper ends are liable to be detached from the bead filler and the separation failure is induced.

Figure 2:
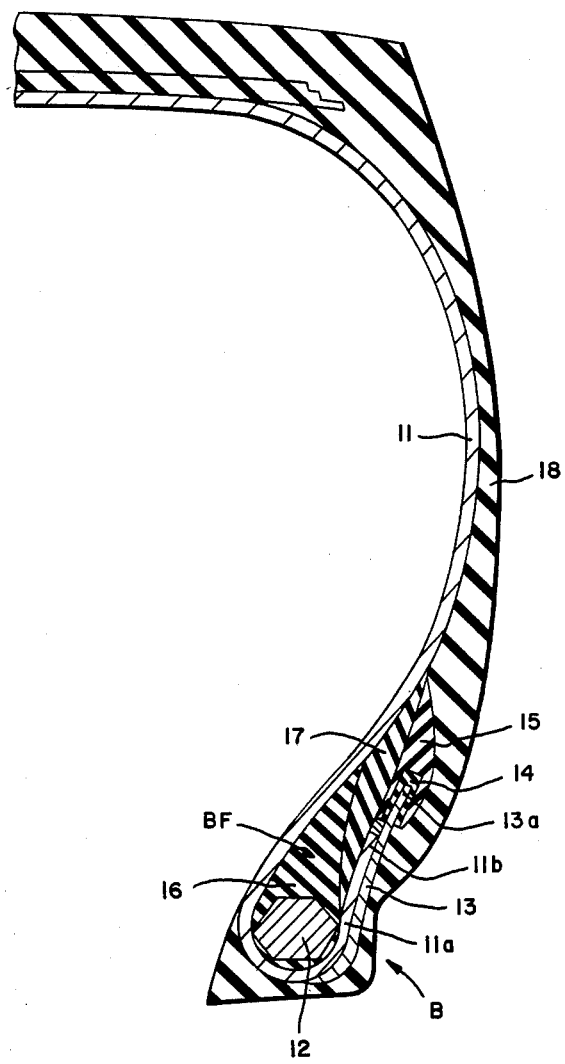
FIG. 2 is a cross-sectional view of the right half of a tire showing one embodiment in accordance with the present invention.

Referring to FIG. 2 showing an embodiment of the present invention, reference numeral 11 designates carcass plies of steel cords, being disposed at an angle of 90° with respect to the equatorial line of the tire extending from one bead portion B to another bead portion B, the opposite ends of the carcass plies being turned up around the bead core 12 from the inside to the outside to form the turn-ups 11a. Reinforcing strip of steel cords 13 is provided outwardly adjacent to the turn-ups 11a and extends toward the lower region beyond the upper end 11b of the turn-ups.

A bead filler BF is disposed at the area enclosed by the carcass plies 11, the turn-ups 11a and the reinforcing strip of steel cords 13 with a top portion extending to a side wall 18. Said bead filler BF is so formed as to be an approximately triangular shape in cross section consisting of high hardness rubber stock 16 of triangular sectional shape and medium hardness rubber stock 17 positioned outwardly adjacent to said high hardness rubber stock 16.

The upper end 13a of the reinforcing strip of the steel cords is covered with a cap 14 made of a rubberized cord fabric of organic textile cords such as nylon cords. Disposed radially outwardly of the capped end and axially outwardly adjacent to the medium hardness rubber stock 17 is a rubber buffer 15.

In the bead structure according to the present invention, the reinforcing strip of steel cords 13 and the high hardness rubber stock 16 enhance the high rigidity of the bead portion B and provide a high driving efficiency. When the lower portion of the side wall 18 undergoes a compressive stress under loaded condition, the rubber buffer 15 is readily deformed depending on the magnitude of the produced stress and absorbs the exerted stress. Accordingly, the stress affecting the vicinity of the upper end 13a of the reinforcing strip of steel cords 13 is diminished so as to enhance the separation resistance and thus a highly durable bead structure is obtained.

Figure 3:
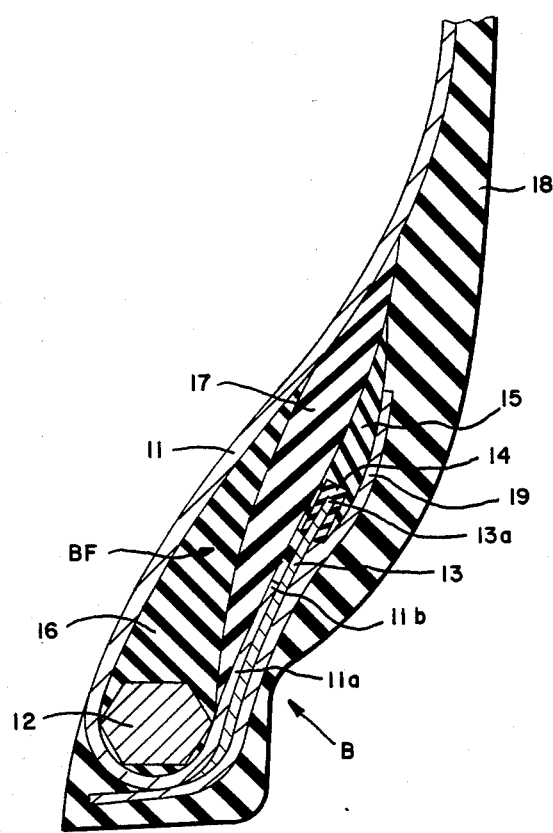
FIG. 3 is a cross-sectional view of the lower part in a tire having reinforcing strip of organic textile cords provided in addition to the bead portion of the tire according to the present invention shown in FIG. 2.

In FIG. 3, reference numeral 11 designates carcass plies consisting plies of steel cords turned up around the bead core 12 from the inside to the outside to form the turn-ups 11a. Reinforcing strip of steel cords 13 is provided outwardly adjacent to the turn-ups 11a and extends radially outwardly beyond the upper end 11b of the turn-ups.

Reinforcing strip of organic textile cords 19 is further provided outwardly adjacent to the reinforcing strip of the steel cords 13, extending from a radially inner side of the carcass plies 11 to a radially outward position of the upper end 13a of the reinforcing strip of steel cords 13. A bead filler BF consisting of high hardness rubber stock 16 and medium hardness rubber stock 17 is disposed at the region enclosed by the carcass plies 11, the turn-ups of the carcass plies 11a and the reinforcing strip of steel cords 13 with a top portion extending to a side wall 18. The upper end 13a of the reinforcing strip of steel cords is further covered with a cap 14 made of a rubberized cord fabric of organic textile cords such as nylon cords. Disposed radially outwardly of the capped end is a rubber buffer 15 sandwiched between the medium hardness rubber stock 17 and the reinforcing strip of organic textile cords 19. A tire thus constructed is more effective than the tire shown in FIG. 2 in preventing a separation because the reinforcing strip of organic textile cords restrains the movement of the reinforcing strip of steel cords.

EMBODIMENT 1

In accordance with the present invention, the tires of 10.00 R 20 in size are prepared. The detailed structure of the tires are described hereunder. A single layer of carcass ply of steel cords is employed. The opposite ends of the carcass ply is turned up around the bead core 12 from the inside to the outside with the turn-up 11a having the radial dimension within 18% of the tire sectional height, that is, a vertical dimension from a bead heel to the crown outer surface. A reinforcing strip of steel cords 13 is provided outwardly adjacent to the turn-up of the carcass ply with steel cords inclined at an angle of 45° with respect to the radial direction of the tire. The reinforcing strip of steel cords extends from the radially inward position of the bead core 12 up to 23% of the tire sectional height. The upper end 13a of the reinforcing strip of steel cords is covered with a cap made of 45° bias cut nylon cord fabric rubberized with a rubber compound having good adhesive property to steel cords. A rubber buffer having a hardness shown in Table 1 is disposed on the cap. High hardness rubber stock of the hardness 80° and the medium hardness rubber stock having a hardness shown in Table 1 are disposed at the area enclosed by the carcass plies 11, the turn-ups 11a of carcass plies and the reinforcing strip of steel cords 13 with the top extending to the side wall 18 to form an approximately triangular shaped bead filler BF.

Drum trsts for durability were conducted upon the tires 10.00 R 20 constructed as above. The test results are shown in Table 1. The drum tests for durability were conducted by comparing the running distance of each test tire until the separation occurs at the bead portion under such high loading conditions as an inflation pressure of 9 kg/cm$^2$, a load of 5,400 kg and a running speed of 40 km/hr. The running distances are represented for comparison by means of an index by setting 100 for a distance of test tire No. 11 wherein the difference of hardness is zero.

EMBODIMENT 2

In addition to the structure of the tire 10.00 R 20 shown in the aforedescribed embodiment 1, a reinforcing strip of organic textile cords 19 comprising two nylon cord plies is provided outwardly adjacent to the reinforcing strip of steel cords extending from the radially inner side of the carcass plies 11 beyond a radially outward position of the upper end 13a of the reinforcing strip of steel cords. The hardness of the medium hardness rubber stocks and the rubber buffer and the results of the drum test are also shown in Table 1.

as that of the test tire No. 11. The tests also reveal that, as shown in Table 1, the tires having the hardness difference of 3° to 20° between the rubber buffer and the medium hardness rubber stock shows considerable effect for enhancing the durabilities in the bead regions.

The running distance of the embodiment tires Nos. 9 and 10 in which a reinforcing strip of nylon cord plies is provided outwardly adjacent to the reinforcing strip of steel cords is longer than that of the tires in which the same hardness of rubbers are employed as for the rubber buffer and the medium hardness rubber stock and no reinforcing strip of nylon cord plies is provided, until the separation damage occurs at the bead regions. Hence, it is preferable to provide a reinforcing strip of nylon cord plies in a tire. The tests also indicate that, as shown in the comparison tire No. 12, the running distance of a tire in which the hardness of rubber buffer is higher than that of medium hardness rubber stock is shorter than that of the test tire No. 11.

Also recognized from the results in Table 1, the preferable ranges of the hardness of the rubber buffer and that of the medium hardness rubber stock is 45° to 65° and 55° to 70° respectively. If the hardness of the medium hardness rubber stock is more than 70°, the running distance of tires would become rather short.

While certain representative embodiments and details have been shown for the purpose of illustrating the invention, it will be apparent to those skilled in this art that various changes and modifications may be made therein without departing from the spirit or scope of the present invention.

Summing up the test results, the tire having the bead structure described before in accordance with the present invention wherein the rubber buffer has a hardness lower than that of the medium hardness rubber stock by 3° to 20° can attain the remarkable improvement in durability more than expected.

What is claimed is:

TABLE 1

| Reinforcing strip of organic textile cords | EMBODIMENT 1 Not provided | | | | | | | | EMBODIMENT 2 Provided | | COMPARISON Not provided | | |
|---|---|---|---|---|---|---|---|---|---|---|---|---|---|
| Test tire No. | 1 | 2 | 3 | 4 | 5 | 6 | 7 | 8 | 9 | 10 | 11 | 12 | 13 |
| Rubber buffer (A) (JIS hardness) | 45 | 50 | 50 | 55 | 55 | 60 | 60 | 62 | 45 | 60 | 62 | 70 | 80 |
| Medium hardness rubber stock (B) (JIS hardness) | 55 | 65 | 70 | 60 | 65 | 65 | 70 | 65 | 55 | 65 | 62 | 70 | 70 |
| Difference in hardness between (A) and (B) | 10 | 15 | 20 | 5 | 10 | 5 | 10 | 3 | 10 | 5 | 0 | 0 | −10 |
| Durability(index) | 170 | 250 | 230 | 130 | 230 | 120 | 160 | 110 | 230 | 170 | 100 | 90 | 60 |
| Damage | Bead sepa | Stopped | Bead sepa | Bead sepa | Bead sepa | Bead sepa | Bead sepa | Bead sepa | Bead sepa | Bead sepa | Bead sepa | Bead sepa | Bead sepa |

"Bead sepa" indicated in the damage column in Table 1 means the occurence of the separation at the bead portion. "Stopped" in the same column means that the tests were discontinued because no damage occurred at the bead region when the running distance of the tires was 2.5 times as long as that of the standard test Tire No. 11.

The drum tests show that the running distance of the embodiment tires No. 1–No. 10 is longer than that of the comparison tires with conventional structure until the separation damage occurs at the bead region. Especially, the test tire No. 2 having a hardness difference of 15° between the rubber buffer and the medium hardness rubber stock is so duarble in the bead regions that no damage occurs in the running distance 2.5 times as long 1. A pneumatic radial tire comprising:
   one or more carcass ply layers of steel cords extending from one bead portion to another bead portion across a crown portion and disposed at an angle of 90° relative to the equatorial line of the tire whose opposite ends being turned up around a respective annular bead core from the inside to the outside and terminating at the bead region;
   a reinforcing strip of steel cords positioned axially outwardly adjacent to the turn-ups of carcass plies and extending radially outwardly beyond the turn-ups;

a bead filler of approximately triangular sectional shape consisting of high hardness rubber stock of approximately triangular sectional shape and medium hardness rubber stock with a shore hardness of 55° to 70° having a radial dimension longer than that of the high hardness rubber stock and positioned axially outwardly adjacent to the high hardness rubber stock and being disposed at the region enclosed by the carcass plies, the turn-ups of the carcass plies and the reinforcing strip of steel cords with a top portion extending to an upper portion of a side wall;

a cap of organic textile cord fabric covering an upper end of the reinforcing strip of steel cords; and a fin-shaped rubber buffer having a shore hardness lower than that of the medium hardness rubber stock by 3° to 20° disposed radially outwardly of the capped end and axially outwardly adjacent to the medium hardness rubber stock.

2. A pneumatic radial tire according to claim 1, wherein a reinforcing strip of organic textile cords is further disposed outwardly adjacent to the reinforcing strip of steel cords.

3. A pneumatic radial tire according to claim 1, wherein a shore hardness of the medium hardness rubber stock is 65° to 70° and a shore hardness of the rubber buffer is 50° to 55°.

4. A pneumatic radial tire according to claim 1, wherein a shore hardness of the medium hardness rubber stock is 65° to 70° and a shore hardness of the buffer is lower than that of the medium hardness rubber stock by 10° to 20°.

* * * * *